United States Patent
Clement et al.

(10) Patent No.: US 6,355,845 B1
(45) Date of Patent: Mar. 12, 2002

(54) POLYMERIZATION OF ALKYLENE OXIDES USING METAL CYANIDE CATALYSTS AND UNSATURATED INITIATOR COMPOUNDS

(75) Inventors: Katherine S. Clement, Lake Jackson; Louis L. Walker, Clute; Richard M. Wehmeyer, Lake Jackson; Wanda W. Rauscher, Angleton; Robert H. Whitmarsh, Lake Jackson, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/611,498

(22) Filed: Jul. 7, 2000

Related U.S. Application Data

(60) Provisional application No. 60/143,075, filed on Jul. 9, 1999, provisional application No. 60/143,078, filed on Jul. 9, 1999, provisional application No. 60/143,079, filed on Jul. 9, 1999, provisional application No. 60/143,081, filed on Jul. 9, 1999, provisional application No. 60/143,082, filed on Jul. 9, 1999, and provisional application No. 60/205,772, filed on May 19, 2000.

(51) Int. Cl.$^7$ .......................... C07C 43/11; C07C 43/18; C07C 43/20
(52) U.S. Cl. ...................................... 568/616; 568/618
(58) Field of Search ................... 568/616, 618

(56) References Cited

U.S. PATENT DOCUMENTS

| | | | |
|---|---|---|---|
| 3,021,341 A | 2/1962 | Croxall et al. | 260/340 |
| 3,291,607 A | 12/1966 | Dersch et al. | 96/59 |
| 3,427,334 A | 2/1969 | Belner | 260/429 |
| 3,427,335 A | 2/1969 | Herold | 260/429 |
| 3,829,505 A | 8/1974 | Herold | 260/611 |
| 4,053,422 A | 10/1977 | Walker | 252/8.5 |
| 4,843,054 A | 6/1989 | Harper | 502/175 |
| 5,451,631 A | 9/1995 | Guo | 524/529 |
| 5,552,486 A | 9/1996 | Guo et al. | 525/118 |
| 5,786,514 A | 7/1998 | Shen et al. | 568/315 |
| 5,811,566 A | 9/1998 | Watabe et al. | 556/445 |
| 5,854,386 A | 12/1998 | Shen et al. | 528/403 |
| 5,856,369 A | 1/1999 | Jorgenson et al. | 521/112 |
| 5,877,268 A | 3/1999 | Jorgenson et al. | 528/15 |

FOREIGN PATENT DOCUMENTS

| | | | |
|---|---|---|---|
| DE | 19 39 042 A | 12/1970 | |
| EP | 0 397 036 A2 A3 | 4/1982 | |
| EP | 0 049 358 A1 | 11/1990 | |
| JP | 8208426 | 8/1996 | ............ A61K/7/00 |
| WO | 99/10407 | 3/1999 | ........... C08G/65/10 |

OTHER PUBLICATIONS

Petrov et al., The Reactions of Dimethylacetenylcarbinol with Ethylene Oxide, Zh. Obshch. Khim. vol. 51, 1951(1361).

Bottini et al., Base Induced Cyclization Reactions of Propargyloxyethanol and the 2–Haloallyloxyethanols, Journal Org. Chem. vol. 30, 1965 (2988).

Hernandez et al., Synthesis of a Series of Symmetrically Disubstituted Diacetylenes with Polychlorophenyl Rings as Side Groups and Linear Polyether Chains as Spacers, Institut de Ciencia, 1992 (1164).

Pola et al., Polarizability of Some Groups Attached to Oxygen in Ethers, Coll. Czech. Chem. Comm. vol. 43, 1978(760).

U.S. application Ser. No. 60/205,718, Clement et al., filed May 19, 2000.

U.S. application Ser. No. 60/205,771, Clement et al., filed May 19, 2000.

*Primary Examiner*—Sreeni Padmanabhan
*Assistant Examiner*—Sikarl A. Witherspoon

(57) ABSTRACT

Certain alcohol initiators containing unconjugated carbon-carbon double bonds can be alkoxylated with excellent efficiency and low production of by-products using a metal cyanide catalyst.

16 Claims, No Drawings

POLYMERIZATION OF ALKYLENE OXIDES USING METAL CYANIDE CATALYSTS AND UNSATURATED INITIATOR COMPOUNDS

This application claims the benefit of U.S. Provisional Application No. 60/143,075 filed Jul. 9, 1999; U.S. Provisional Application No. 60/143,078 filed Jul. 9, 1999; U.S. Provisional Application No. 60/143,079 filed Jul. 9, 1999; U.S. Provisional Application No. 60/143,081 filed Jul. 9, 1999; U.S. Provisional Application No. 60/143,082 filed Jul. 9, 1999; and U.S. Provisional Application No. 60/205,772 filed May 19, 2000.

BACKGROUND OF THE INVENTION

This invention relates to processes for preparing poly(oxyalkylene) polymers and to methods for preparing same.

Polyethers made from alkylene oxides are well known and useful in a number of applications such as detergent and cleaner compositions, oil well drilling fluids, inks, metal working fluids, lubricants in paper coating compositions, ceramics manufacturing, chemical intermediates for non-ionic surfactants which in turn are used in cosmetics, textiles and chemical processing, polyurethanes which are used as flexible foams and elastomers, chemical intermediates for esters which are used in textile spin finishes, cosmetic agents, and as foam control agents for a wide variety of processes. These polymers may have no more than one oxyalkylene group in succession, or be a higher molecular weight polymer containing one or more long chains of consecutive oxyalkylene groups.

Polyethers of this type are commonly made through an anionic polymerization process, whereby the alkylene oxide is combined with an initiator compound and a strongly basic catalyst such as potassium hydroxide or certain organic amines. The initiator compound contains one or more oxyalkylatable groups such as hydroxyl, thiol, carboxylic acid and the like. The initiator compound determines the functionality (i.e., number of hydroxyl groups/molecule of product) and in some cases may introduce some desired functional group into the product.

There are some disadvantages of polymerizing alkylene oxides using these strongly basic catalysts. One problem is that the strongly basic catalysts do not produce a low polydispersity product when a tertiary alcohol initiator compound is used. In addition, the basic catalyst usually must be removed from the product before it is used, which increases manufacturing costs.

In addition, some kinds of initiator compounds cannot be alkoxylated using strongly basic catalysts, because they contain base-sensitive functional groups. For example, initiators containing certain types of alkenyl or alkynyl groups undergo a side reaction in which the alkenyl or alkynyl group will "migrate" along the molecular chain, so that the unsaturation in the polyether is at a different place than it was on the initiator. This is of particular concern when terminal unsaturation is desired. Often, unsaturation that is in a terminal position on the initiator migrates to a non-terminal position during the alkoxylation reaction.

Unsaturated compounds in which a triple bond is adjacent to a hydroxyl-substituted carbon atom are prone to decomposing during the alkoxylation reaction. Many compounds of this type are reaction products of acetylene with a ketone such as acetone or an aldehyde such as acetaldehyde. Alkali metal or alkaline earth bases can cause these initiators to decompose to regenerate acetylene. Acetylene is an explosion hazard.

In order to try to avoid these problems, Lewis acids such as boron trifluoride-diethyl etherate and organic amines such as triethylamine have been tried. However, some of these catalysts tend to promote the formation of large amounts of by-products, especially when it is attempted to add three or more moles of alkylene oxide per equivalent of initiator compound. The Lewis acid catalysts tend to catalyze "back-biting" reactions where the growing polymer chain reacts with itself. The reactions form cyclic ethers such as dioxane, dimethyldioxane and various crown ethers. These cannot be removed easily from the desired product, and so the product cannot be used in many applications.

Thus, it would be desirable to provide a method whereby polyethers made using certain unsaturated initiator compounds could be produced in good yield with low levels of by-products.

SUMMARY OF THE INVENTION

In one aspect, this invention is a process for preparing a polyether, comprising forming a mixture of an initiator compound having one or more oxyalkylatable groups, at least one alkylene oxide and a metal cyanide catalyst complex, and subjecting the mixture to conditions sufficient to activate the catalyst complex and to alkoxylate the oxyalkylatable groups of the initiator, wherein the initiator compound contains nonconjugated carbon-carbon unsaturation that is (a) migratable, as defined below, (b) adjacent to a hydroxyl-substituted tertiary carbon atom, or both (a) and (b).

In a second aspect, this invention is a poly(alkylene oxide) polymer containing the residue of an initiator compound having nonconjugated carbon-carbon unsaturation that is (a) migratable, as defined below, (b) adjacent to a hydroxyl-substituted tertiary carbon atom, or both (a) and (b), the polymer having an average alkoxy degree of polymerization of at least three moles of alkylene oxide per equivalent of initiator compound.

This invention permits the ready formation of polymers of unsaturated initiators containing certain types of carbon-carbon unsaturation that tend to engage in side-reactions during previous alkoxylation processes. The product polymers contain desired, predetermined types of carbon-carbon unsaturation that are predictable from the selection of the initiator compound.

DETAILED DESCRIPTION OF THE INVENTION

In this invention, certain initiator compounds are alkoxylated by reaction with one or more alkylene oxides in the presence of a catalytically effective amount of a metal cyanide catalyst. The alkoxylation is conducted by combining the initiator, metal cyanide catalyst and alkylene oxide. The catalyst is then allowed to become activated in the presence of the alkylene oxide. Once the catalyst has become activated, the mixture is subjected to conditions sufficient to polymerize the alkylene oxide. In this manner, the initiator compound becomes alkoxylated until poly(oxyalkylene) chains of a desired length are introduced. As discussed below, once polymerization has begun, other types of monomers that are copolymerizable with alkylene oxides can be polymerized as well.

The initiator compound used in the process contains carbon-carbon unsaturation, i.e., a carbon-carbon double bond (i.e., an alkenyl group) and/or a carbon-carbon triple bond (i.e., an alkynyl group). The carbon-carbon unsaturation is not conjugated, i.e., is not part of a sequence of two or more double or triple bonds that alternate with single bonds. Thus, the carbon-carbon unsaturation is not part of an aliphatic hydrocarbyl conjugated structure (such as —CH═CH—(CH═CH—)$_x$), part of an aromatic group, nor part of a conjugated structure including carbonyl groups (such as a —CR═CR—C(O)— grouping, as is present, for example, in acrylic or methacrylic compounds, maleic acid, fumaric acid, and the like). In the forgoing structure, each R independently represents hydrogen or an unsubstituted or inertly substituted group hydrocarbon that is attached to the indicated carbon atom through a carbon-carbon single bond. By "inertly substituted", it is meant a group that does not react under the conditions of the alkoxylation process of the invention.

In addition, the carbon-carbon unsaturation is either migratable, adjacent to a hydroxyl-substituted tertiary carbon atom, an alkyne which is base sensitive or any combination of the above. In the case of a carbon-carbon double bond, "migratable" means that the unsaturation is adjacent to a —CHR$^6$— group that is not substituted with any heteroatom, where R$^6$ is hydrogen or an unsubstituted or inertly substituted alkyl group. Thus, a migratable alkenyl group would have the structure —CR═CR—CHR$^6$—R$^1$OH, where R is as defined above and R$^1$ is an unsubstituted or inertly substituted alkylene group. A migratable alkynyl group is adjacent to a methylene group and would have the structure —C≡C—CH$_2$—R$^1$OH, where R$^1$ is as defined above. Unsaturation of this type can "migrate" to the adjacent —CHR$^6$— or —CH$_2$— group under basic conditions. Thus, for example, the migratable alkenyl group shown above can isomerize to form a —CHR—CR═CR$^6$—R$^1$OH group under basic conditions. In the same way, the migratable alkynyl group shown above can isomerize to form a —CH$_2$—C≡C—R$^1$OH group. Among the initiators of this type, those in which the carbon-carbon unsaturation occupies a terminal position (i.e. those of the general structure H$_2$C═C—CHR$^6$—R$^1$—OH or H$_2$C≡C—CH$_2$—R$^1$—OH are of particular interest. Among the initiators of this type are 3-butyn-1-ol, 3-butene-1-ol, cyclohex-2-ene-1-ol and the like. Carbon-carbon unsaturation adjacent to a hydroxyl-substituted tertiary carbon atom can be represented by the structures

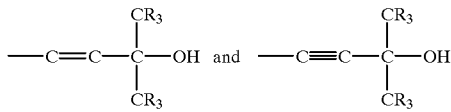

where R is as defined above. These compounds are of particular interest because they form products having broad polydispersities under standard alkoxylation conditions with alkali or alkaline earth catalysis. Furthermore, alkyne unsaturation adjacent to a hydroxyl-substituted or alkoxy substituted carbon atom tends to decompose under basic conditions forming acetylene in some cases and creating an explosion hazard. Among the initiators of this type are 2-methyl-3-butyn-2-ol, 2-methyl-3-butyne-2-ol, 3,5-dimethyl-1-hexyn-3-ol, 3,6-dimethyl-4-octyne-3,6-diol, 2,5-dimethyl-3-hexyn-2,5-diol, 2,4,7,9-tetramethyl-5-decyn-4,7-diol, 3-butyn-2-ol, propargyl alcohol, 2-methyl-3-butyn-2-ol and the like, as well as other alkynyl tertiary alcohols that are formed in the reaction of acetylene and a ketone such as acetone in various proportions, and ethoxylated derivatives thereof.

The alkoxylation is performed by first mixing the initiator, catalyst and an alkylene oxide and allowing the mixture to sit for a period of time at room or an elevated temperature. When these materials are mixed, a so-called induction period occurs, during which the oxyalkylene reaction occurs very slowly. The induction period may range from a few minutes to several hours, depending on the particular catalyst that is used and the temperature. During this induction period, the catalyst becomes activated, and rapid polymerization of the alkylene oxide then commences.

The starting mixture of catalyst, initiator compound and alkylene oxide is conveniently made by combining the catalyst and initiator compound in a pressure reactor (or by forming the catalyst in the initiator), and then pressurizing the reactor with an initial quantity of alkylene oxide. The induction period follows, as indicated by a nearly constant or slowly decreasing pressure in the reactor. The onset of rapid polymerization that follows the induction period is evidenced by a drop in pressure as the alkylene oxide is consumed.

The starting mixture of catalyst, initiator compound and alkylene oxide may be brought to any convenient temperature, such as from about 20° C., preferably from about 50° C., more preferably from about 70° C., even more preferably from about 80° C. to about 150° C., most preferably to about 100° C. These temperatures are also suitable for conducting the polymerization once the catalyst is activated.

Depending on the desired degree of alkoxylation, all the necessary alkylene oxide may be added to the reactor at the outset. It is usually preferred to add more alkylene oxide to the reactor once the catalyst has become activated, especially when making higher molecular weight polyethers. A convenient way of adding the alkylene oxide is to pressurize the reactor with alkylene oxide and allow alkylene oxide to feed to the reactor on demand, maintaining a more or less constant pressure inside the reactor. Alternatively, any additional alkylene oxide may be fed in one or more discrete increments.

The total amount of alkylene oxide that is fed will depend on the desired equivalent weight of the product. As few as one mole of alkylene oxide per equivalent of initiator compound can be added. This invention is particularly suited for polymerizing at least about 3 moles of alkylene oxide per equivalent of initiator compound. Sufficient alkylene oxide can be added to make any desirable molecular weight polyether, such as one having a weight average molecular weight of 200,000 daltons or more. However, in most cases the intended end-use of the product will dictate its molecular or equivalent weight. Thus, for example, for making polyols for polyurethane applications, polyether equivalent weights of from about 75–500 are of particular interest for rigid polyurethane foams, equivalent weights of from about 300–1300 are of particular interest for making molded foams and high resiliency slabstock foams, and equivalent weights of from about 800–3000 are of particular interest for making conventional slabstock foam and reaction injection molded elastomers. For surfactant applications, molecular weights of from about 350 to about 6000 are of particular interest. In most applications, it is desirable that the product be a liquid. Poly(oxyethylene) homopolymers tend to form solids when their weight average molecular weights exceed about 700 daltons. Thus, when a poly(ethylene oxide) homopolymer is made in accordance with the invention, preferred molecular weights are about 1000 or below. All weights reported above are number average molecular weights.

Similarly, the selection of alkylene oxide will depend to a large extent on the intended end-use of the product. Among the alkylene oxides that can be polymerized with the catalyst complex of the invention are ethylene oxide, propylene oxide, 1,2-butylene oxide, styrene oxide, and mixtures thereof. Mixtures of these can be used, and two or more of them can be polymerized sequentially to make block copolymers. For polyurethanes applications, preferred alkylene oxides are propylene oxide alone, mixtures of at least 50 weight % propylene oxide and up to about 50 weight % ethylene oxide (to form a random copolymer), and propylene oxide followed by ethylene oxide, so as to form terminal poly(oxyethylene) chains constituting up to about 30% of the total weight of the product. For other applications, ethylene oxide alone, 1,2-butylene oxide, ethylene oxide/1,2-butylene oxide mixtures, ethylene oxide followed by propylene oxide or butylene oxide, butylene oxide followed by ethylene and/or propylene oxide, propylene oxide alone, mixtures of propylene oxide and ethylene and/or butylene oxide, and propylene oxide followed by ethylene and/or butylene oxide are preferred alkylene oxides.

In addition, monomers that will copolymerize with the alkylene oxide in the presence of the catalyst complex can be used to prepare modified polyether polyols, after the catalyst has become activated. Such comonomers include oxetanes as described in U.S. Pat. Nos. 3,278,457 and 3,404,109 and anhydrides as described in U.S. Pat. Nos. 5,145,883 and 3,538,043, which yield polyethers and polyester or polyetherester polyols, respectively. Lactones as described in U.S. Pat. No. 5,525,702 and carbon dioxide are examples of other suitable monomers that can be polymerized with the catalyst of the invention.

The polymerization reaction may be performed continuously or batchwise. In such continuous processes, the activated initiator/catalyst mixture is continuously fed into a continuous reactor such as a continuously stirred tank reactor (CSTR) or a tubular reactor. A feed of alkylene oxide is introduced into the reactor and the product continuously removed.

An advantage of this invention is that no polymerization inhibitors are needed in order to prevent vinyl polymerization of the initiator compound. Similarly, there is no need to employ low alkoxylation temperatures in order to prevent vinyl polymerization.

The concentration of the catalyst is selected to polymerize the alkylene oxide at a desired rate or within a desired period of time. Generally, a suitable amount of catalyst is from about 5 to about 10,000 parts by weight metal cyanide catalyst complex per million parts of the product. For determining the amount of catalyst complex to use, the weight of the product is generally considered to equal the combined weight of alkylene oxide and initiator, plus any comonomers that may be used. More preferred catalyst complex levels are from about 10, especially from about 25, to about 5000, more preferably about 3000 ppm, on the same basis.

The metal cyanide catalyst can be represented by the general formula:

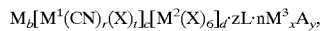
$M_b[M^1(CN)_r(X)_t]_c[M^2(X)_6]_d \cdot zL \cdot nM^3_xA_y$, wherein M is a metal ion that forms an insoluble precipitate with the $M^1(CN)_r(X)_t$ group and which has at least one water soluble salt;

$M^1$ and $M^2$ are transition metal ions that may be the same or different;

each X independently represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2;

z is zero or a positive number and n is a positive number indicating the relative quantities of the complexing agent and $M_xA_y$, respectively. z and n may be fractions.

The X groups in any $M^2(X)_6$ do not have to be all the same. The molar ratio of c:d is advantageously from about 100:0 to about 20:80, more preferably from about 100:0 to about 50:50, and even more preferably from about 100:0 to about 80:20.

Similarly, the catalyst may contain two or more types of $M^1(CN)_r(X)_t$ groups and two or more types of $M^2(X)_6$ groups.

M and $M^3$ are preferably metal ions selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M and $M^3$ are more preferably $Zn^{+2}$, $Fe^{+2}$, $Co^{+2}$, $Ni^{+2}$, $La^{+3}$ and $Cr^{+3}$. M is most preferably $Zn^{+2}$.

Suitable anions A include halides such as chloride and bromide, nitrate, sulfate, carbonate, cyanide, oxalate, thiocyanate, isocyanate, perchlorate, isothiocyanate, and a $C_{1-4}$ carboxylate. Chloride ion is especially preferred.

$M^1$ and $M^2$ are preferably $Fe^{+3}$, $Fe^{+2}$, $Co^{+3}$, $Co^{+2}$, $Cr^{+2}$, $Cr^{+3}$, $Mn^{+30\ 2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred.

Preferred groups X include anions such as halide (especially chloride), hydroxide, sulfate, $C_{1-4}$ carbonate, oxalate, thiocyanate, isocyanate, isothiocyanate, $C_{1-4}$ carboxylate and nitrite ($NO_2-$), and uncharged species such as CO, $H_2O$ and NO. Particularly preferred groups X are NO, $NO_2-$ and CO.

The catalyst is usually complexed with an organic complexing agent. A great number of complexing agents are potentially useful, although catalyst activity may vary according to the selection of a particular complexing agent. Examples of such complexing agents include alcohols, aldehydes, ketones, ethers, amides, nitriles, sulfides, and the like.

Suitable alcohols include monoalcohols and polyalcohols. Suitable monoalcohols include methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol, 1-t-butoxy-2-propanol and the like. Suitable monoalcohols also include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols.

Suitable polyalcohols include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside, and the like. Low molecular weight polyether polyols, particular those having an equivalent weight of about 350 or less, more preferably about 125–250, are also useful complexing agents.

Suitable aldehydes include formaldehyde, acetaldehyde, butyraldehyde, valeric aldehyde, glyoxal, benzaldehyde, toluic aldehyde and the like. Suitable ketones include acetone, methyl ethyl ketone, 3-pentanone, 2-hexanone and the like.

Suitable ethers include cyclic ethers such as dioxane, trioxymethylene and paraformaldehyde as well as acyclic ethers such as diethyl ether, 1-ethoxy pentane, bis (betachloro ethyl) ether, methyl propyl ether, diethoxy methane, dialkyl ethers of alkylene or polyalkylene glycols (such as ethylene glycol dimethyl ether, diethylene glycol dimethyl ether, triethylene glycol dimethyl ether and octaethylene glycol dimethyl ether), and the like.

Amides such as formamide, acetamide, propionamide, butyramide and valeramide are useful complexing agents. Esters such as amyl formate, ethyl formate, hexyl formate, propyl formate, ethyl acetate, methyl acetate, triethylene glycol diacetate and the like can be used as well. Suitable nitriles include acetonitrile, proprionitrile and the like. Suitable sulfides include dimethyl sulfide, diethyl sulfide, dibutyl sulfide, diamyl sulfide and the like.

Preferred complexing agents are t-butanol, 1-t-butoxy-2-propanol, polyether polyols having an equivalent weight of about 75–350 and dialkyl ethers of alkylene and polyalkylene glycols. Especially preferred complexing agents are t-butanol, 1-t-butoxy-2-propanol, polyether polyols having an equivalent weight of 125–250 and a dimethyl ether of mono-, di- or triethylene glycol. t-Butanol and glyme (1,2-dimethoxy ethane) are especially preferred.

A silane-functional complexing agent, as described in the copending application of Wehmeyer, application no. 09/574,842, entitled Method for Preparing Metal Cyanide Catalysts using Silane-functional Ligands, filed May 19, 2000, may be used instead of or in addition to the aforementioned complexing agents. As described therein, the silane-functional complexing agent may be polymerized to form a film or polymer, optionally on a support, or may function as a coupling agent to attach the catalyst complex to a support material.

In addition, the catalyst complex often contains a quantity of water that is bound into the crystalline lattice of the complex. Although the amount of bound water is difficult to determine, it is believed that this amount is typically from about 0.25 to about 3 moles of water per mole of $M_1$ and $M^2$ ions.

Exemplary catalysts include:
Zinc hexacyanocobaltate.$zL.aH_2O.nZnCl_2$;
$Zn[Co(CN)_5NO].zL.aH_2O.nZnCl_2$;
$Zn_s[Co(CN)_6]_o[Fe(CN)_5NO]_p.zL.aH_2O.nZnCl_2$ (o, p=positive numbers, s=1.5o +p);
$Zn_s[Co(CN)_6]_o[Co(NO_2)_6]_p[Fe(CN)_5NO]_q.zL.aH_2O.nZnCl_2$ (o, p, q=positive numbers, s=1.5(o+p)+q);
Zinc hexacyanocobaltate.$zL.aH_2O.nLaCl_3$;
$Zn[Co(CN)_5NO].zL.aH_2O.nLaCl_3$;
$Zn[Co(CN)_6]_o[Fe(CN)_5NO]_p.zL.aH_2O.nLaCl_3$ (o, p=positive numbers, s=1.5o+p);
$Zn_s[Co(CN)_6]_o[Co(NO_2)_6]_p[Fe(CN)_5NO]_q.zL.aH_2O.nLaCl_3$ (o, p, q=positive numbers, s=1.5(o+p)+q);
Zinc hexacyanocobaltate.$zL.aH_2O.nCrCl_3$;
$Zn[Co(CN)_5NO].zL.aH_2O.nCrCl_3$;
$Zn_s[Co(CN)_6]_o[Fe(CN)_5NO]_p.zL.aH_2O.nCrCl_3$ (o, p=positive numbers, s=1.5o+p);
$Zn_s[Co(CN)_6]_o[Co(NO_2)_6]_p[Fe(CN)_5NO]_q.zL.aH_2O.nCrCl_3$ (o, p, q=positive numbers, s=1.5(o+p)+q);
Magnesium hexacyanocobaltate.$zL.aH_2O.nZnCl_2$;
$Mg[Co(CN)_5NO].zL.aH_2O.nZnCl_2$;
$Mg_s[Co(CN)_6]_o[Fe(CN)_5NO]_p.zL.aH_2O.nZnCl_2$ (o, p=positive numbers,s=1.5o +p);
$Mg_s[Co(CN)_6]_o[Co(NO_2)_6]_p[Fe(CN)_5NO]_q.zL.aH_2O.nZnCl_2$ (o, p, q=positive numbers, s=1.5(o+p)+q);
Magnesium hexacyanocobaltate.$zL.aH_2O.nLaCl_3$;
$Mg[Co(CN)_5NO].zL.aH_2O.nLaCl_3$;
$Mg_s[Co(CN)_6]_o[Fe(CN)_5NO]_p.zL.aH_2O.nLaCl_3$ (o, p=positive numbers, s=1.5o +p);
$Mg_s[Co(CN)_6]_o[Co(NO_2)_6]_p[Fe(CN)_5NO]_q.zL.aH_2O.nLaCl_3$ (o, p, q=positive numbers, s=1.5(o+p)+q);
Magnesium hexacyanocobaltate.$zL.aH_2O.nCrCl_3$;
$Mg[Co(CN)_5NO].zL.aH_2O.nCrCl_3$;
$Mg_s[Co(CN)_6]_o[Fe(CN)_5NO]_p.zL.aH_2O.nCrCl_3$ (o, p=positive numbers, s=1.5o +p);
$Mg_s[Co(CN)_6]_o[Co(NO_2)_6]_p[Fe(CN)_5NO]_q.zL.aH_2O.nCrCl_3$ (o, p, q=positive numbers, s=1.5(o+p)+q);

as well as the various complexes such as are described at column 3 of U.S. Pat. No. 3,404,109, incorporated herein by reference.

The catalyst complex may be supported. One method of making a supported catalyst is by precipitating the catalyst in the presence of a polycarboxyl or polycarboxylate compound, as described in copending application of Wehmeyer, application number 09/574,848, entitled Method for Preparing Metal Cyanide Catalysts using Polycarboxylic Acids filed May 19, 2000. Supported catalysts as described in WO 99/44379 are also useful. In addition, supported catalysts can be prepared as described in the copending application of Wehmeyer, application number 09/574,842 entitled Method for Preparing Metal Cyanide Catalysts Using Silane-Functional Ligands, filed May 19, 2000.

The catalyst complex is conveniently made using standard precipitation methods as are described, for example, in U.S. Pat. Nos. 3,278,457, 3,278,458, 3,278,459, 3,404,109, 3,427,256, 3,427,334, 3,427,335, 5,470,813, 5,482,908, 5,536,883, 5,589,431, 5,627,120, 5,627,122, 5,639,705, 5,714,428, 5,731,407, 5,780,584, 5,783,513, all incorporated herein by reference. In addition, the catalyst may be formed directly as a dispersion in an initiator compound, as described in copending application of Wehmeyer, application no. 09/574,847 entitled Method for Preparing Metal Cyanide Catalyst/Polyol Initiator Slurries filed May 19, 2000, or through an incipient wetness technique as described in the copending application of Molzahn et al, application no 09/574,844 entitled Incipient Wetness Method for Making Metal-Containing Cyanide Catalysts, filed May 19, 2000.

The product polyether contains one or more chains of oxyalkylene groups that are bonded to the initiator compound through a heteroatom. The heteroatom is preferably oxygen and the linkage is most preferably an ether linkage.

The product polyether is typically prepared in good yield with only small amounts of undesired by-products. In some instances, the product may contain a high molecular weight fraction that has a weight average molecular weight of 1.5X or more of that of the desired product. Typically, when this fraction is present, it constitutes about 20% or less, more typically less than about 10% of the total weight of the product.

Other than the high molecular weight fraction, the process of the invention permits the alkoxylation of a wide range of initiator compounds with the formation of few by-products. By-products other than unreacted starting materials and the high molecular weight fraction typically constitute less than about 10% by weight of the product, more typically less than about 5 weight percent and even more typically less than about 2 weight percent.

In particular, the product is characterized in that the unsaturation from the initiator compound is to a very large degree unaffected by the polymerization process. Migratable carbon-carbon unsaturation tends not to migrate under the conditions of the polymerization reaction. Hydroxyl-substituted tertiary carbon atoms adjacent to carbon-carbon unsaturation tend to be unaffected by the process, and in particular these tertiary carbons do not cleave from the adjacent unsaturated group to form by-products such as acetylene. Thus, the product of this invention typically contains no more than about 10 weight percent, preferably less than about 5 weight percent and even more preferably less than about 2 weight percent of by-products, other than unreacted starting materials and the high molecular weight fraction, based on the total weight of the product, prior to any clean-up or purification.

The product polyether is generally characterized by having a good polydispersity, typically less than about 2.0, more typically less than about 1.6 and preferably less than about 1.2, as crude products before purification to remove high molecular weight species. These polydispersities can be obtained even when the initiator contains secondary or tertiary oxyalkylatable groups.

The following examples are provided to illustrate the invention, but are not intended to limit its scope. All parts and percentages are by weight unless otherwise indicated.

EXAMPLE 1

A zinc hexacyanocobaltate/t-butanol/450 MW poly (propylene oxide) triol catalyst complex (6.8 g) and 229.86 g of 2-methyl-3-butyn-2-ol are charged to a 2 gallon reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (50 g) is added. The mixture is heated and stirred. A small pressure drop is observed after about 20 minutes. Thirty minutes after the initial addition of ethylene oxide, an additional 50 g of ethylene oxide is added. Another 950 g of ethylene oxide are then fed upon demand. As the reaction progresses, a vigorous exotherm develops. The EO feeds out rapidly and is digested quickly. The product is a pale yellow liquid that becomes opaque but remains liquid as it cools to room temperature. The $M_n$ of the product is 560, and the polydispersity is 1.63. NMR analysis shows that the ethylene oxide has added onto the initiator.

EXAMPLE 2

2-methyl-3-butyn-2-ol (233.84 g), 4.26 g of the catalyst complex described in Example 1 and 950 grams of ethylene oxide are polymerized in the same manner as described in Example 1, except that the initial charge of ethylene oxide weighs about 75–100 g. The reaction proceeds more slowly than that of Example 1. A brown product of 370 $M_n$ and 2.03 polydispersity is obtained. NMR analysis clearly shows that the 2-methyl-3-butyn-2-ol has initiated the polymerization.

EXAMPLE 3

A zinc hexacyanocobaltate/t-butanol/450 MW poly (propylene oxide) triol catalyst complex (6.0 g) and 271.87 g of 2-methyl-3-butyn-2-ol are charged to a 2 gallon reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (135 g) is added. After thirty minutes, an additional 50 g of ethylene oxide is. After another 90 minutes, another 50 g of ethylene oxide is added. About two hours after that, an ethylene oxide feed to the reactor is begun, starting at 1 g/min and gradually increasing to 4 g/min and then decreasing to 3.5 g/min, until a total of 1105 g ethylene oxide has been added. The yield is 1260 g of a very light colored liquid which becomes opaque upon standing overnight but remains fluid. GPC analysis shows the product to have a $M_n$ of 380, with a main fraction at $M_n$ 360 (polydispersity of 1.31) and a small fraction at $M_n$ 1560 (polydispersity of 1.03). Overall polydispersity is 1.37. $C^{13}$ NMR analysis showed that some starting material remains in the product.

EXAMPLE 4

A zinc hexacyanocobaltate/t-butanol/450 MW poly (propylene oxide) triol catalyst complex (0.53 g) and 235.05 g of 2-methyl-3-buten-2-ol are homogenized and charged under nitrogen to a 2 gallon reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (about 50–150 g) is added. When the pressure in the reactor drops, indicating the start of polymerization, a feed of ethylene oxide is begun. The feed rate is varied until a constant reactor pressure is obtained. A total of 2165 g of ethylene oxide is added. As the reaction progresses, a vigorous exotherm develops. The product has a $M_n$ of 940 and a polydispersity of approximately 1.1.

EXAMPLE 5

A. Preparation of Supported Metal Cyanide Catalyst

A mixture of 600 mL water and 5 g (about 0.0454 eq. —COO—) of small (99% <1000 microns) lightly crosslinked poly(acrylic acid) potassium salt beads (Aldrich catalog #43,532-5) is prepared. The beads swell when added to the water. To the mixture is added a solution of 4.0 g (0.036 eq.) $K_3Co(CN)_6$ in 100 mL of water. With mixing, a solution of 19.35 g (0.284 eq.) zinc chloride in 50 mL water is added to the bead mixture over about 1 minute. As soon as the zinc chloride addition is complete, 100 mL t-butanol is added. The resulting mixture is stirred for 10 minutes, then filtered through Whatman® #4 filter paper. The collected solids are reslurried in a solution of 6.45 g (0.094 eq.) zinc chloride in 140 mL t-butanol and 60 mL water, stirred for 10 minutes and filtered again. The solids are again reslurried in 200 mL t-butanol, stirred for 10 minutes and filtered as before. A white, powdery filtrate is obtained, which is dried overnight in a vacuum over (30 mm Hg, 50° C.). The mass of the dried catalyst complex is 8.85 g.

B. Ethoxylation of 2-methyl-3-butyn-2-ol 2-methyl-3-butyn-2-ol (259.24 g) is ethoxylated with 1050 g ethylene oxide according the general method described in Example 1, using 16.6 g of the supported catalyst from part A. The product has an $M_n$ of 380 and a polydispersity of about 1.66.

EXAMPLE 6

A. Preparation of Supported Metal Cyanide Catalyst 89.65 g of a 3.66 wt % solution of $H_3CO(CN)_6$ in methanol (15.05 mmol $H_3Co(CN)_6$) is added over 15 minutes to a stirred mixture of $ZnCl_2$ (6.15 g, 45.2 mmol), 25.0 g of an 8000 molecular weight bis(dimethoxymethylsilyl)-terminated poly(propylene oxide) (Aldrich catalog #45,041-3) and 15 g tetraethyl orthosilicate (15.0 g) in 150 mL methanol. A slurry forms immediately. After stirring the slurry for 15 minutes, water (5.2 g) is added and the mixture stirred for 5 minutes. The slurry is then added in small batches over about 110 minutes to 150 g silica gel (60–200 mesh particles, 150A pore size, Aldrich catalog #24,3998-1) while the flask is occasionally swirled and shaken to allow the silica to be uniformly wetted. The silica is stripped on a rotoevaporator at 70–75° C. bath temp and 25 inches Hg vacuum once during the coating process, after approximately two-thirds of the total slurry is added. After the slurry is added the silica is further dried on the rotoevaporator at 70–75° C. bath temp and 25 inches Hg vacuum, then finally at 70–75° C. bath temp (>30 inches Hg vacuum) for approximately 10–15 min. The product is further dried in a vacuum oven at full pump vacuum (90–95° C./>30 in Hg vacuum) for 14 hours. The resultant product contains approximately 4.2% catalyst.

B. Ethoxylation of 2-methyl-3-butyn-2-ol 2-methyl-3-butyn-2-ol (257.61 g) is ethoxylated with 1005 g ethylene oxide according the general method described in Example 1, using 16.6 g of the supported catalyst from part A. The product has a polydispersity of about 1.4.

EXAMPLE 7

Allyl alcohol (284.37 g) is ethoxylated with 1615 g ethylene oxide in the presence of 2.86 g of a zinc hexacyanocobaltate/t-butanol/450 MW poly(propylene oxide) triol catalyst complex, according the general method described in Example 1. $C^{13}$ NMR confirms that the ethoxylate of allyl alcohol has been formed. The unsaturation in allyl alcohol starting material appears at 115 ppm and 137 ppm and the product unsaturation appears at 117 ppm and 135 ppm. The $M_n$ of the primary product is 380. The high molecular weight wax constitutes 3.4 wt % of the total product and has a $M_n$ of 3300. Polydispersity is 1.06 by GPC.

EXAMPLE 8

The ability of several catalysts to ethoxylate various initiator compounds is evaluated by placing a quantity of the initiator, a catalyst and ethylene oxide into a dried Wheaton vial fitted with a stir bar. The vial is sealed with a septum cap and purged with nitrogen. About 0.5 g of ethylene oxide are added by syringe and the septum cap is replaced with a solid cap under nitrogen. The vial is heated at 90° C. for 14 hours. Table 1 identifies certain other reaction parameters, as well as characteristics of the resulting polymer.

In all cases, $C^{13}$ NMR confirms that the initiator compound is consumed in the alkoxylation reaction.

The initiators are:

A. 3-butyn-1-ol
B. 3,5-dimethyl-1-hexyn-3-ol
C. 3-methyl-1-pentyn-3-ol
D. 2-methyl-3-butyn-2-ol
E. 2-methyl-3-buten-2-ol The catalysts are:

A. Zinc hexacyanocobaltate complexed with t-butanol and treated with a 450 molecular weight poly(propylene oxide) triol.

B. Zinc hexacyanocobaltate complexed with glyme.

C. A supported catalyst made as follows: A mixture of 600 mL water and 5 g (about 0.0454 eq. —COO—) of small (99%<1000 microns) lightly crosslinked poly(acrylic acid) potssium salt beads (Aldrich catalog #43,532-5) is prepared. To the mixture is added a solution of 4.0 g (0.036 eq.) $K_3Co(CN)_6$ in 100 mL of water. With mixing, a solution of 19.35 g (0.284 eq.) zinc chloride in 50 mL water is added to the bead mixture over about 1 minute. As soon as the zinc chloride addition is complete, 100 mL t-butanol is added. The resulting mixture is stirred for 10 minutes, then filtered through Whatman® #4 filter paper. The collected solids are reslurried in a solution of 6.45 g (0.094 eq.) zinc chloride in 140 mL t-butanol and 60 mL water, stirred for 10 minutes and filtered again. The solids are again reslurried in 200 mL t-butanol, stirred for 10 minutes and filtered as before. A white, powdery filtrate is obtained, which is dried overnight in a vacuum over (30 mm Hg, 50° C.).

D. A supported catalyst made as follows: A mixture of 50 mL water and 5 g of a 45% solution of poly(acrylic acid) sodium salt in water (Aldrich catalog #41,601-0, about 0.053 mol $Na^+$) is prepared. To the mixture is added a solution of 4.0 g (0.036 eq.) $K_3Co(CN)_6$ in 70 mL of water. With mixing, a solution of 19.35 g (0.142 mol) zinc chloride in 40 mL water is added over about 1 minute. A white precipitate forms immediately. A mixture of 50 mL t-butanol and 50 mL water is added, and the mixture is stirred for 10 minutes and filtered through Whatman® #4 filter paper. The collected solids are reslurried in a solution of 6.45 g zinc chloride in 140 mL t-butanol and 60 mL water, stirred for 10 minutes and filtered again. The collected solids are then reslurried in 200 mL t-butanol, stirred as before and filtered again. A white filtrate is obtained, which is dried overnight in a vacuum oven (30 mm Hg, 50° C.).

E. A supported catalyst made as follows: A solution of potassium hydroxide in water (0.053 moles KOH in 50 mL water is added to solid 1,3,5-benzene tricarboxylic acid (BTA) (3.71 g, 0.177 mmol), and diluted to a volume of 300 mL with additional water. An additional 0.26 g of solid 85% KOH and a small quantity of potassium bicarbonate are added to form a clear, colorless solution. Solid $K_3Co(CN)_6$ (4.0 g, 0.012 mol) is added with stirring. Then, a solution of 19.35 g (0.142 mol) zinc chloride in 40 mL of water is added with continued stirring. A white flocculent forms as the zinc chloride solution is added. A solution of 50 mL water and 50 mL of t-butanol is immediately added. The mixture is stirred for 10 minutes and filtered through Whatman® #41 filter paper. The filtered solid is reslurried in a solution of zinc chloride (6.45 g, 0.047 mol) in 140 mL t-butanol and 60 mL water, stirred 10 minutes and filtered again. The filtered solids are then reslurried in 200 mL t-butanol, stirred 10 minutes, filtered and dried in a vacuum oven overnight at 50° C. The mass of the final product is 10.16 g.

F. A supported catalyst made as follows: 30.72 g of the $H_3CO(CN)_6$ solution (6.02 mmol $H_3Co(CN)_6$) is stirred into a mixture of zinc chloride (2.461 g, 18.1 mmol), 8 g of an 8000 molecular weight bis(dimethoxymethylsilyl)-terminated poly(propylene oxide) (Aldrich catalogue #45, 041-3), tetraethyl orthosilicate (1.0 g, 4.8 mmol), and 30 mL of methanol. A slurry forms, which is stirred for about 10 minutes before 0.36 g of water is added. The slurry is then stirred for an additional 5–10 minutes prior to addition to the various supports. The resultant methanolic slurry contains approximately 4.53 wt % of metal cyanide catalyst. Part (22.9 g) of the slurry is added in one portion to 10 g (undried weight) of Grade 62, 60–200 mesh silica gel particles. The solvent is then removed using a rotoevaporator, initially at 70–75° C./25 inches Hg vacuum, followed by a few minutes at 30 inches Hg vacuum on the rotoevaporator. The product is further dried overnight in a vacuum oven at 50° C./<30 inches Hg vacuum. The product is estimated to contain 7.7 wt. % metal cyanide catalyst (as $Zn_3[Co(CN)_6]_2 \cdot nZnCl_2$, ignoring any associated water and complexing agent).

G. A supported catalyst made as follows: 30.72 g of a $H_3CO(CN)_6$ solution (6.02 mmol $H_3Co(CN)_6$) is stirred into a mixture of zinc chloride (2.461 g, 18.1 mmol), 8 g of an 8000 molecular weight bis(dimethoxymethylsilyl)-terminated poly(propylene oxide) (Aldrich catalogue #45,041-3), tetraethyl orthosilicate (1.0 g, 4.8 mmol), and 30 mL of methanol. A slurry forms, which is stirred for about 10 minutes before 0.36 g of water is added. The slurry is then stirred for an additional 5–10 minutes prior to addition to the various supports. The resultant methanolic slurry contains approximately 4.53 wt % of metal cyanide catalyst. 20.0 g of the resulting slurry is added in batches to 25 g (undried weight, including about 13% water) of 6–16 mesh, irregularly shaped silica gel chips, with periodic removal of solvent during the additions using a rotoevaporator. After the addition of the slurry is complete, the product is further stripped on the rotoevaporator at 70–75° C./25 inches Hg vacuum. This is followed by a few minutes at 30 inches Hg vacuum on the rotoevaporator. The product is further dried overnight in a vacuum oven at 50° C./<30 inches Hg vacuum. The product is estimated to contain 3.5 wt. % metal cyanide catalyst.

H. A supported catalyst made as follows: 30.72 g of a $H_3Co(CN)_6$ solution (6.02 mmol $H_3CO(CN)_6$) is stirred into a mixture of zinc chloride (2.461 g, 18.1 mmol), 8 g of an 8000 molecular weight bis(dimethoxymethylsilyl)-terminated poly(propylene oxide) (Aldrich catalogue #45,041-3), tetraethyl orthosilicate (1.0 g, 4.8 mmol), and 30 mL of methanol. A slurry forms, which is stirred for about 10 minutes before 0.36 g of water is added. The slurry is then stirred for an additional 5–10 minutes prior to addition to the various supports. The resultant methanolic slurry contains approximately 4.53 wt % of metal cyanide catalyst. 20.0 g of the slurry is added in batches to 25 g porous 7/32" diameter alumina spheres, with periodic removal of solvent during the additions using a rotoevaporator. After the addition of the slurry is complete, the product is further stripped on the rotoevaporator at 70–75° C./25 inches Hg vacuum. This is followed by a few minutes at 30 inches Hg vacuum on the rotoevaporator. The product is further dried overnight in a vacuum oven at 50° C./<30 inches Hg vacuum. The product is estimated to contain 3.3 wt. % metal cyanide catalyst.

I. A supported catalyst made as follows: About 15.36 g of a $H_3Co(CN)_6$ solution (3.01 mmol $H_3Co(CN)_6$) is stirred into a mixture of zinc chloride (1.026 g), 2 g of an 8000 molecular weight bis(dimethoxymethylsilyl)-terminated poly(propylene oxide) (Aldrich catalog #45,041-3), and 20 mL of methanol. A slurry forms, which is stirred for about 10 minutes before 0.25 g of tetraethyl orthosilicate is added. After stirring another 10 minutes, the resulting slurry is added in batches to 10 g of Grade 62, 60–200 mesh silica gel particles, with periodic removal of solvent during the additions using a rotoevaporator (70–75° C./25 inches Hg vacuum). After the addition of the slurry is complete, the product is further stripped on the rotoevaporator at 70–75° C./25 inches Hg vacuum. This is followed by a few minutes at 30 inches Hg vacuum. Further drying overnight at 50° C., the product contains approximately 10.2 wt % metal cyanide catalyst.

J. A supported catalyst is made as follows: 89.65 g of a 3.66 wt % solution of $H_3Co(CN)_6$ in methanol (15.05 mmol $H_3Co(CN)_6$) is added over 15 minutes to a stirred mixture of $ZnCl_2$ (6.15 g), 25.0 g of an 8000 molecular weight bis(dimethoxymethylsilyl)-terminated poly(propylene oxide) (Aldrich catalog #45,041-3) and 15 g tetraethyl orthosilicate in 150 mL methanol. After stirring the slurry for 15 minutes, water (5.2 g) is added and the mixture stirred for 5 minutes. The slurry is then added in small batches over about 110 minutes to 150 g silica gel (60–200 mesh particles, 150A pore size, Aldrich catalog #24,3998-1) while the flask is occasionally swirled and shaken to allow the silica to be uniformly wetted. The silica is stripped on a rotoevaporator at 70–75° C. bath temp and 25 inches Hg vacuum once during the coating process, after approximately two-thirds of the total slurry is added. After the slurry is added the silica is further dried on the rotoevaporator at 70–75° C. bath temp and 25 inches Hg vacuum, then finally at 70–75° C. bath temp (>30 inches Hg vacuum) for approximately 10–15 min. The product is further dried in a vacuum oven at full pump vacuum (90–95 ° C./>30 in Hg vacuum) for 14 hours. The resultant product contains approximately 4.2% catalyst.

TABLE 1

| Sample | Initiator | | Catalyst | | | Product | |
| --- | --- | --- | --- | --- | --- | --- | --- |
| Letter | Type | mg | Type | mg | EO, Grams | $M_n$ | PDI |
| A | A | 115.3 | A | 6.1 | .5 | 300 | 1.4 |
| B | B | 190.4 | A | .12 | .5 | 420 | 2.62 |
| C | A | 102.9 | A | 1.8 | .5 | 460 | 1.24 |
| D | C | 146.7 | A | 1.37 | .5 | 520 | 1.77 |
| E | D | 133.5 | B | 6.7 | .5 | 470 | 2.13 |
| F | A | 115.3 | B | 6.1 | .5 | 390 | 1.77 |
| G | D | 137.2 | C | 18.1 | .5 | 240 | 2.17 |
| H | D | 164.3 | D | 32.9 | .5 | 300 | 1.67 |
| I | D | 137.7 | E | 28.6 | .5 | 310 | 2.06 |
| J | D | 125.1 | F | 8.03 | .5 | 460 | 1.65 |
| K | D | 131.9 | G | 6.38 | .5 | 320 | 1.63 |
| L | D | 136.2 | H | 23 | .5 | 460 | 1.3 |
| M | D | 131.3 | I | 16 | .5 | 450 | 1.38 |
| N | E | 130.4 | J | 35.5 | .5 | 390 | 1.72 |

What is claimed is:

1. A process for preparing a polyether, comprising forming a mixture of an initiator compound having one or one oxyalkylatable groups, at least one alkylene oxide and a metal cyanide catalyst complex and in the absence of a polymerization inhibitor, and subjecting the mixture to conditions sufficient to activate the catalyst complex and to alkoxylate the oxyalkylatable groups of the initiator, wherein the initiator compound contains nonconjugated, carbon-carbon unsaturation that is (a) migratable, (b) adjacent to a hydroxyl-substituted tertiary carbon atom, or (c) both (a) and (b); and wherein the polyethers so prepared have an average molecular weight of up to 6000.

2. The process of claim 1 wherein the carbon-carbon unsaturation is a migratable double bond.

3. The process of claim 2 wherein the alkylene oxide is ethylene oxide.

4. The process of claim 2 wherein the alkylene oxide is propylene oxide or 1,2-butylene oxide.

5. The process of claim 2 wherein the initiator compound contains at least one secondary or tertiary hydroxyl group, at least three moles of alkylene oxide are added per equivalent of initiator, and the polydispersity of the product is less than about 1.25.

6. The process of claim 5 wherein the initiator compound is 3-buten-1-ol, or cyclohex-2-ene-1-ol.

7. The process of claim 1 wherein the carbon-carbon unsaturation is a migratable triple bond.

8. The process of claim 7 wherein the alkylene oxide is ethylene oxide.

9. The process of claim 7 wherein the alkylene oxide is propylene oxide or 1,2-butylene oxide.

10. The process of claim 7 wherein the initiator compound contains at least one secondary or tertiary hydroxyl group, at least three moles of alkylene oxide are added per equivalent of initiator, and the polydispersity of the product is less than about 1.25.

11. The process of claim 10 wherein the initiator compound is 3-butyn-1-ol.

12. The process of claim 1 wherein the initiator contains an alkynyl group adjacent to a hydroxyl-substituted tertiary carbon atom.

13. The process of claim 12 wherein the alkylene oxide is ethylene oxide.

14. The process of claim 12 wherein the initiator compound contains at least one secondary or tertiary hydroxyl group, at least three moles of alkylene oxide are added per equivalent of initiator, and the polydispersity of the product is less than about 1.25.

15. The process of claim 14 wherein the initiator compound is 2-methyl-3-butyn-2-ol, 2-methyl-3-butene-2-ol, 3,5-dimethyl-1-hexyn-3-ol, 3,6-dimethyl-4-octyne-3,6-diol, 2,5-dimethyl-3-hexyn-2,5-diol or 2,4,7,9-tetramethyl-5-decyne-4,7-diol.

16. The process of claim 1 wherein the polyether so produced has an average molecular weight of up to 1000 and contains nonconjugated, carbon-carbon unsaturation that is a residue from the initiator.

* * * * *